(12) United States Patent
Friesen et al.

(10) Patent No.: US 8,877,391 B2
(45) Date of Patent: Nov. 4, 2014

(54) ELECTROCHEMICAL CELL, AND PARTICULARLY A CELL WITH ELECTRODEPOSITED FUEL

(75) Inventors: Cody A. Friesen, Fort McDowell, AZ (US); Todd Trimble, Phoenix, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 860 days.

(21) Appl. No.: 13/028,496

(22) Filed: Feb. 16, 2011

(65) Prior Publication Data

US 2011/0200893 A1    Aug. 18, 2011

Related U.S. Application Data

(60) Provisional application No. 61/304,928, filed on Feb. 16, 2010.

(51) Int. Cl.
*H01M 8/22* (2006.01)
*H01M 12/08* (2006.01)

(52) U.S. Cl.
CPC ...... *H01M 12/08* (2013.01); *H01M 2300/0014* (2013.01)
USPC .......................................... 429/404; 205/261

(58) Field of Classification Search
USPC .................................. 429/404; 205/261, 311
See application file for complete search history.

(56) References Cited

U.S. PATENT DOCUMENTS

| | | | |
|---|---|---|---|
| 6,027,827 A | 2/2000 | Gan et al. | |
| 2002/0155327 A1* | 10/2002 | Faris | 429/9 |
| 2004/0053132 A1 | 3/2004 | Smedley | |
| 2009/0061293 A1 | 3/2009 | Webber | |
| 2009/0284229 A1 | 11/2009 | Friesen et al. | |
| 2010/0119895 A1 | 5/2010 | Friesen | |
| 2010/0285375 A1 | 11/2010 | Friesen et al. | |
| 2010/0316935 A1 | 12/2010 | Friesen et al. | |
| 2011/0039181 A1 | 2/2011 | Friesen et al. | |
| 2011/0070506 A1 | 3/2011 | Friesen et al. | |
| 2011/0086278 A1 | 4/2011 | Friesen et al. | |

FOREIGN PATENT DOCUMENTS

| | | |
|---|---|---|
| EP | 0278997 A1 | 8/1988 |
| GB | 757294 A | 9/1956 |
| JP | 2000204056 A | 7/2000 |

OTHER PUBLICATIONS

International Preliminary Report on Patentability regarding PCT/US2011/025016, mailed Aug. 30, 2012, 9 pages.
International Search Report and Written Opinion in related application PCT/US2011/025016 mailed May 26, 2011.

* cited by examiner

*Primary Examiner* — Stewart Fraser
*Assistant Examiner* — Monique Wills
(74) *Attorney, Agent, or Firm* — Pillsbury Winthrop Shaw Pittman LLP

(57) ABSTRACT

The present invention relates to an electrochemical cell for generating electrical power that includes an anode, a cathode, a charging electrode and an ionically conductive medium containing at least metal fuel ions and poly(ethylene glycol) tetrahydrofurfuryl. The present invention also relates to a method for charging the cell by electrodeposition of metal fuel on the anode thereof.

65 Claims, 12 Drawing Sheets

No additive

No additive

PEG-Diacid (250)

PEG-Diacid (250)

Commercial non-PEG-based additive

Commercial non-PEG-based additive (same as above)

Charge passed during oxidation and eventual passivation of Zn sheet showing passivation delay in the presence of 1.5mL/L PEGTHF (current density = 50mA/cm$^2$).

Charge passed during oxidation and eventual passivation of Zn sheet showing passivation delay in the presence of 1.5mL/L PEGTHF (current density = 100mA/cm$^2$).

ELECTROCHEMICAL CELL, AND PARTICULARLY A CELL WITH ELECTRODEPOSITED FUEL

RELATED APPLICATION

This application claims priority from U.S. Provisional Application Ser. No. 61/304,928, filed Feb. 16, 2010, which is hereby incorporated herein by reference in its entirety.

FIELD

The present application is related to an electrochemical cell for generating power, and more particularly a cell using electrodeposited fuel. The cell's ionically conductive medium includes an advantageous additive for enhancing electrodeposition and/or extending capacity.

All publications, patents, and patent applications cited in this Specification are hereby incorporated by reference in their entirety.

BACKGROUND

Electrochemical cells using metal as a fuel are known. Electrochemical cells using an electrolyte, a solution of solvent molecules and solute ions, as an ionically conductive medium are also known. Electrolytes maintain ionic conductivity because solvent molecules solvate with solute ions due to thermodynamic interactions between those species. In an electrochemical cell using metal as the fuel, metal fuel is oxidized during discharge to reducible metal fuel ions at a fuel electrode functioning as an anode, the oxidized metal fuel ions remain in the electrolyte solution in reducible form (either as solvated ions, or combined with other ions, such as in a molecule or complex). During charging, the reducible metal fuel ions are reduced to metal fuel at the interface between the electrolyte and the fuel electrode, which is now functioning as a cathode—the metal fuel thus plates the fuel electrode by this process, known as electrodeposition.

The electrolyte solution may comprise an additive. Electrochemical cells using an additive in the electrolyte are known. Examples of such devices are shown, for example, in U.S. Pat. No. 6,027,827 and United States Patent Application Pub. No. 2009/0061293, which are incorporated herein in their entirety. Additives for different electrochemical systems may include nitrite, lithium iodide, carbon dioxide or sulfur dioxide. Benefits of additive use in an electrochemical cell may, for instance, improve the electrochemical reactions by means of forming an ionically conductive layer on an electrode or decreasing wettability issues of electrodes. Yet, the additive may, in result, impede the function or efficiency of the electrochemical cell. For example, an electrolyte in a regenerative cell that promotes quick electroplating may concurrently promote less dense electroplating of the metal fuel on an electrode. Less metal fuel is then available as energy for the electrochemical cell reactions during discharge.

SUMMARY

One aspect of the invention provides a method for operating an electrochemical cell, wherein the cell comprises: a first electrode; a second electrode spaced apart from the first electrode; a charging electrode; an ionically conductive medium communicating the electrodes, the ionically conductive medium comprising reducible metal fuel ions and an additive comprising poly(ethylene glycol)tetrahydrofurfuryl, wherein the method comprises charging the electrochemical cell by: i. applying an electrical current between the charging electrode and the first electrode with the charging electrode functioning as an anode and the first electrode functioning as a cathode, such that the reducible metal fuel ions are reduced and electrodeposited as metal fuel in oxidizable form on the first electrode; and ii. removing the electrical current to discontinue the charging.

The method may further comprise generating electrical current using the electrochemical cell by oxidizing the metal fuel at the first electrode functioning as an anode and reducing an oxidizer at the second electrode functioning as a cathode whereby electrons are generated for conduction from the first electrode to the second electrode via a load, and the oxidized metal fuel ions and reduced oxidizer ions react to form a by-product.

Another aspect of the invention provides an electrochemical cell comprising: a first electrode for oxidizing a metal fuel during discharging and reducing reducible ions of the metal fuel during recharging; a second electrode spaced apart from the first electrode for at least reducing an oxidizer during discharging; a charging electrode for oxidizing oxidizable ions of the oxidizer during recharging; an ionically conductive medium communicating the electrodes, the ionically conductive medium comprising reducible metal fuel ions and an additive comprising poly(ethylene glycol)tetrahydrofurfuryl.

In any aspect of the invention, the charging electrode may be selected from the group consisting of (a) the second electrode, (b) a third electrode spaced apart from the first and second electrodes, and (c) one or more bodies of the first electrode wherein the first electrode comprises a plurality of permeable bodies for receiving the metal fuel.

Yet another aspect of the invention provides an ionically conductive medium for use in a rechargeable current producing electrochemical cell comprising: a liquid comprising ions for supporting oxidation and reduction reactions at the electrodes of the cell; and an additive comprising poly(ethylene glycol)tetrahydrofurfuryl for improving cell performance.

Other aspects of the present invention will become apparent from the following detailed description, the accompanying drawings, and the appended claims.

DETAILED DESCRIPTION

The Figures illustrate embodiments of various aspects of the inventions claimed. These embodiments are in no way intended to be limiting, and are intended only as an example for facilitating an understanding of the principles of the claimed inventions.

The principles of the presently described embodiments may be broadly applied to any electrochemical cell where a fuel, such as a metal fuel, is electrodeposited on the fuel electrode (i.e., the electrode with the metal fuel, which functions as the anode during discharging). Such cells may include batteries, such as metal—air batteries, for example.

For example, one non-limiting example of an electrochemical cell with which the principles of the present invention may be used is shown in U.S. patent application Ser. No. 12/385,489, filed Apr. 9, 2008, the entirety of which is incorporated herein by reference. Other examples include those shown in U.S. patent application Ser. Nos. 12/385,217; 12/631,484; 12/549,617; 12/885,268; 12/901,410; 61/249, 217; 61/301,377; 61/325,384; 61/378,021; 61/394,954; 61/358,339; 61/383,510; and 61/243,970, each of which is incorporated herein by reference.

Figure 1:
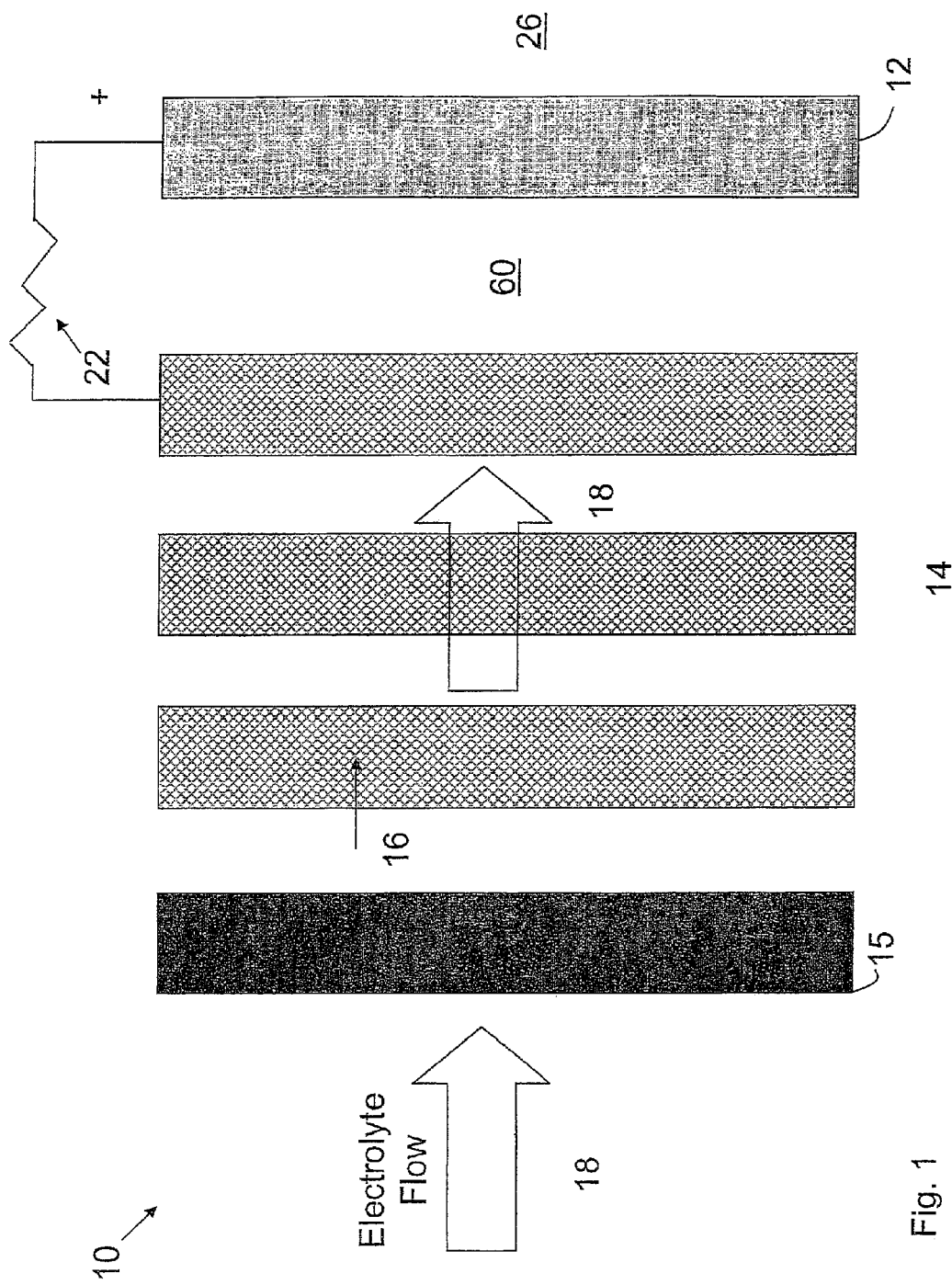
FIG. 1 is a schematic view of an electrochemical cell with a stack of permeable electrode bodies for generating electricity.

FIG. 1 illustrates another example of an electrochemical cell, generally indicated at 10, according to the embodiments of the present invention. As illustrated and discussed in further detail below, the electrochemical cell 10 has a first electrode 14 and a second electrode 12. As used herein, the first electrode 14 is where the fuel of the system is oxidized. The first electrode 14 comprises the fuel in the form of solid fuel electrodeposited on an electro conductive electrode body, but may be generally referred to as the first electrode 14, even when no fuel is present. As used herein, the second electrode 12 is where the oxidizer of the system is reduced. In an embodiment, the second electrode 12 for each cell may be provided by smaller, separate, and individual second electrodes 12 instead of a larger "single cathode."

As shown in FIG. 1, the first electrode 14 and the second electrode 12 can be spaced apart to define a gap 60 therebetween. The gap 60 generally can be an essentially empty gap for permitting fluid flow from or between the first electrode 14 to the second electrode 12. Preferably, the width of the gap 60 is essentially constant along the (vertical, as shown in FIG. 1) length of the electrodes, but in some configurations, it may be altered. The fluid flow through the gap will be discussed in further detail below. It should be noted that the presence of fluid flow in the cell is preferred in some embodiments, but not necessary.

In an embodiment, the gap 60 between the first electrode 14 and the second electrode 12 may have channels or other features for facilitating flow of ionically conductive medium 18 and oxidized fuel (as discussed below). In this embodiment, the gap 60 may not have a proton exchange membrane, and instead allows fluid flow of the ionically conductive medium 18 and oxidized fuel into the gap 60, as discussed below. For example, the gap 60 could be occupied by a porous, non-reactive, and non-conductive spacer that still allows the flow, such as a spacer having a honeycomb configuration or a porous frit. Preferably, the gap 60 is an open space that allows for convective flow, as discussed in further detail below.

As shown in FIG. 1, and as discussed in further detail below, an ionically conductive medium, generally indicated at 18, communicates with both the first electrode 14 and the second electrode 12. The ionically conductive medium 18 may flow in directions other than what is illustrated, including parallel to the electrodes. Thus, any directional references are made with regard to the orientation in FIG. 1, and are not intended to limit a working embodiment to any particular orientation. In other embodiments, the ionically conductive medium 18 may be static with no flow at all. The ionically conductive medium 18 may make contact with the first electrode 14 at an ionically conductive medium/first electrode interface 16 where metal fuel electroplates the first electrode 14, as discussed below.

The ionically conductive material 18 may be an electrolyte solution. Hereinafter, the ionically conductive material 18 will be referred to as the electrolyte 18. The electrolyte 18 may be an aqueous solution. Examples of suitable electrolytes include aqueous solutions comprising sulfuric acid, phosphoric acid, triflic acid, nitric acid, potassium hydroxide, sodium hydroxide, sodium chloride, potassium nitrate, or lithium chloride. The electrolyte may also use a non-aqueous solvent or an ionic liquid, such as is disclosed in U.S. patent application Ser. Nos. 12/776,962, 61/177,072 and 61/267, 240, the entirety of which are incorporated herein by reference. Any ionically conductive medium may be used. In the non-limiting embodiment described herein, the electrolyte is an aqueous potassium hydroxide solution.

The second electrode 12 generally comprises a porous body covered on the outer side by a gas permeable layer through which an oxidizer may diffuse, but the ionically conductive medium 18 may not pass through. That is, the layer can be gas permeable, but impermeable or essentially impermeable to the ionically conductive medium 18 (i.e., it is gas permeable but not liquid permeable). As an option, the porous body may also be covered on the inner side by a liquid permeable layer through which the ionically conductive medium 18 may pass through so that the ionically conductive medium 18 may contact the porous body. The porous body of the second electrode 12 has a high surface area and comprises a catalyst material that has a high activity for an oxidizer reduction reaction. The illustrated configuration is not limiting, and the second electrode 12 can have any other shape or configuration other than that illustrated, and may have any composition of materials.

The second electrode 12 may be a passive or "breathing" cathode that is passively exposed to the oxidizer source 26 (such as oxygen present in ambient air) and absorbs the oxidizer for consumption in the electrochemical cell 10 reactions commonly referred to as air electrode. That is, the oxidizer, typically oxygen, will permeate from the ambient air into the second electrode 12. Thus, the oxidizer need not be actively pumped or otherwise directed to the second electrode 12, such as via an inlet. Any part of the second electrode 12 by which the oxidizer is absorbed or otherwise permeates or contacts the second electrode 12 may be generically referred to as an "input." The term input may broadly encompass all ways of delivering oxidizer to the second electrode 12 (and that term may similarly be used with reference to any way of delivering fuel to the first electrode 14).

The second electrode 12 may include a catalyst material, such as manganese oxide, nickel, pyrolized cobalt, activated carbon, platinum, or any other catalyst material or mixture of materials with high oxygen reduction activity in the ionically conductive medium 18 for catalyzing reduction of the oxidizer, which will be discussed below. The porous body of the second electrode 12 may comprise the catalyst material.

As illustrated in FIG. 1, the first electrode 14 has a substantially rectangular configuration. However, this configuration is not intended to be limiting, and the first electrode 14 could have any other shape or configuration other than that illustrated. The first electrode 14 may comprise multiple electrode bodies as discussed below. Each body is configured to allow the electrolyte 18 to flow through it, while enabling fuel to be electrodeposited thereon during charging. It is the combination of the body or bodies and the fuel particles that comprise the first electrode 14.

Other materials or methods of forming the electrode bodies of the first electrode 14 may be used. For example, the body may include channels, grooves, bores, pores, mesh, or any other formations able to receive electrodeposited particles of the fuel from the electrolyte 18 flowing through or over it. In an embodiment, a body may include one or more screens of brass, bronze, stainless steel, nickel, monel, carbon or any other high conductivity material. A body may be any other conductor that can act as a reduction site in electrodeposition.

Oxidation of the fuel at the first electrode 14 during discharge provides oxidized fuel ions ionically conducted by the electrolyte 18. By retaining the fuel on the first electrode 14 bodies, a continuous source of released or liberated electrons and resulting fuel ions may be provided.

During discharge, as illustrated in FIG. 1, fuel oxidation occurs to oxidize the fuel into at least oxidized fuel ions that remain in the electrolyte 18 and electrons for conduction by the first electrode 14 to the second electrode 12 through the external load 22. The external load 22 is connected to the first electrode 14 and second electrode 12 as shown in FIG. 1. The oxidation reaction will be discussed below.

In an embodiment, the electrochemical cell 10 may be configured to provide a pressure differential that creates a flow of the electrolyte 18 through the first electrode 14, into a gap 60 and towards the second electrode 12. Within the gap 60, a transport flow of the electrolyte 18 flows across the gap 60 from the first electrode 14 to the second electrode 12. The term "transport flow" refers to a fluid flow of the electrolyte 18 across the gap 60, which transports the oxidized fuel ions away from the first electrode 14 and towards the second electrode 12. Thus, the fuel ions may be transported convectively by the flowing electrolyte 18, rather than relying solely on conduction or diffusion within the electrolyte 18. Here in the illustrated embodiment, the primary direction of the transport flow is away from the first electrode 14 to the second electrode 12.

Although the electrochemical cell system 10 may be passively operated, such as by gravity feed or by motion of the device (e.g., for a portable cell, such as in a watch, kinetic energy from motion of the user could be used to generate the flow), in an embodiment a flow generator, such as a small pump, may be used to generate flow of the electrolyte. The pump may be any suitable pump, such as a piezoelectric pump, a centrifugal pump, a gear pump, a peristaltic pump, etc. The pump may be used in various configurations and in electrochemical cells 10 of various sizes. The flow generator could have any construction or configuration. Thus, the term flow generator is intended to broadly encompass both active powered and passive non-powered mechanisms for generating flow.

As mentioned above, the presence of flow within the cell is preferred, but not required. Thus, the electrolyte 18 may be static, rather than flowing, and no flow generator would be used.

Any such electrically powered flow generator may optionally be coupled directly or indirectly to the first electrode 14 and the second electrode 12 so that it can draw power, thus providing a self-powering electrochemical cell 10. A battery or other alternative power source may be provided to initially power such a flow generator, and a switch may be used to enable the generator to draw power from the first electrode 14 and second electrode 12 or the alternative power source as needed. A controller may switch the flow generator from the initial power source to the electrochemical cell output power either (i) at a predetermined time after the electrochemical cell operation has started, or (ii) when it detects that the electrochemical cell power output has reached a level sufficient to self-power the flow generator.

The oxidizer may be delivered to the second electrode 12 by a passive transport system. For example, where oxygen present in ambient air is the oxidizer from the oxidizer source 26, simply exposing the second electrode 12 to ambient air may be sufficient to allow diffusion/permeation of oxygen into the second electrode porous body. Other suitable oxidizers may be used (including liquid oxidizers or oxidizers solvated in an electrolyte), and embodiments described herein are not limited to the use of oxygen as the oxidizer.

In other embodiments, an optional pump, such as an air blower, may be used to deliver the oxidizer to the second electrode 12 under pressure. The oxidizer source 26 may be a contained source of oxidizer. Likewise, when the oxidizer is oxygen from ambient air, the oxidizer source 26 may be broadly regarded as the delivery mechanism, be it passive or active, by which the air is permitted to flow to the second electrode 12. Thus, the term "oxidizer source" is intended to encompass both contained oxidizers and/or arrangements for passively or actively delivering oxygen from the ambient air to the second electrode 12.

During discharge, when the first electrode 14 and the second electrode 12 are coupled to the external load 22, reaction among at least the oxidizer and the electrons flowing to the second electrode 12 can occur at the second electrode 12, thus reducing the oxidizer. The reduced oxidizer ions may react with the oxidized fuel ions to complete the electrochemical cell reaction. The oxidizer reduction reaction is also discussed below.

The fuel may be a metal, such as, for example, iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic or molecular form when collected on the electrode body, and the metal fuel may take on any morphology. However, the present invention is not intended to be limited to any specific fuel, and thus any other fuels may be used.

To limit or suppress hydrogen evolution at the first electrode 14, salts may be added to the electrolyte 18 to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. These are optional and may be omitted.

Regarding the specific reactions in one non-limiting embodiment, potassium hydroxide is used as the electrolyte 18 (which is alkaline), zinc (Zn) particles are used as the fuel, and oxygen ($O_2$) from the ambient air is used as the oxidizer.

At the first electrode 14, the zinc is oxidized, as represented by equation (1):

$$Zn + 4OH^- \rightarrow Zn(OH)_4^{2-} + 2e \quad (E° = -1.216\ V). \tag{1}$$

At the second electrode 12, oxygen is reduced, as represented by equation (2):

$$2e^- + \tfrac{1}{2}O_2 + H_2O \rightarrow 2OH^- \quad (E° = +0.401\ V). \tag{2}$$

In solution, the following reaction occurs as represented by equation (3):

$$Zn(OH)_4^{2-} \rightarrow ZnO + H_2O + 2OH^-. \tag{3}$$

Zinc (Zn) is oxidized at the first electrode 14 and its positive ion ($Zn^{2+}$) is supported by four $OH^-$ ions to create the complex anion $Zn(OH)_4^{2-}$. The concentration of $OH^-$ ions in the electrolyte 18 may be maintained by the reduction reaction of the oxidizer at the second electrode 12 and the release of the $OH^-$ ions from reaction of the $Zn(OH)_4^{2-}$ anion. The electrolyte 18 flow transports the relatively unstable $Zn(OH)_4^{2-}$ ion away from the first electrode 14, thus preventing the zinc ion from reducing back to zinc at the first electrode 14 (which in turn improves efficiency, as electrons are free to flow through the external load 22 rather than being consumed by reduction of the zincate ion). In the electrolyte 18, the complex $Zn(OH)_4^{2-}$ anion reacts in the solution to provide water ($H_2O$), $OH^-$ ions, and zinc oxide (ZnO), which is present in the electrolyte 18. The zinc oxide (ZnO) is formed by the removal of two of the $OH^-$ ions from the zincate anion ($Zn(OH)_4^{2-}$), the remaining two $OH^-$ ions react to form one water molecule ($H_2O$) and the ZnO product. In some embodiments, the zinc may remain dissolved and not precipitate to ZnO, depending on various factors.

Thus, the overall reaction between the reduced oxidizer ($OH^-$) ions and the oxidized zinc ($Zn^{2+}$) ions provides the intermediary by-product of $Zn(OH)_4^{2-}$, which, when its concentration exceeds the solubility limit, ultimately reacts to become zinc oxide (ZnO). As can be seen from the representative reaction equations set forth above, the remaining constituents of the reactions balance out (i.e., they are consumed or created in equal amounts). Thus, in its simplest form of expression, the net, overall reaction at the first electrode 14 reduces the oxidizer at the second electrode 12 with electrons received from the external load 22, oxidizes the fuel particles at the first electrode 14 to supply electrons to the external load 22, and reacts the reduced oxidizer ion and oxidized fuel ions to form a by-product (in this case, zinc oxide). The optional transport flow in the direction from the first electrode 14 towards the second electrode 12 helps support and drive this process and increases the overall power output.

Additional intermediary reactions may occur at the first electrode 14 and/or the second electrode 12 and/or in the gap 60 therebetween, and the described reactions are not intended to be exclusive of any side or intermediary reaction. Also, the reactions are representative and may be expressed differently, but the general overall reaction results in the oxidation of zinc and reduction of oxygen to produce the by-product of zinc oxide (ZnO) and electrical current that drives the external load 22. The zinc oxide by-product may flow out of the electrochemical cell 10 with the electrolyte 18. As an option, the zinc oxide may be recovered from the flow and the zinc may be separated and reintroduced into the electrolyte 18 at, for example, a fuel source or an electrolyte source. In an embodiment, likewise, the zinc oxide may remain in the electrolyte 18, which is re-circulated through the electrochemical cell 10, and may be re-reduced on the first electrode 14 later during charging. In other embodiments where no flow is present, the zinc oxide may simply remain in the cell.

Although the directional flow in the first electrode 14-second electrode 12 direction can help increase the power output, in certain situations or applications, it may be desirable to minimize or even cease the flow. Even when the flow is stopped, some power may be generated, as ionic transport may occur by natural convection, although the power output would be significantly less than when the electrolyte 18 is flowing and transporting the oxidized fuel ions away from the first electrode 14 and towards the second electrode 12. This "passive operation" state with no or essentially no flow may be useful for powering devices with a standby mode (e.g., a laptop computer) or some other mode where only a small amount of power is required. An optional suitable controller may be used to control whatever flow generator is provided for generating the flow to switch between this passive state and an active state where the transport flow is present.

In designing the various parts, the structures can be manufactured on the microfluidic scale to achieve a small, compact size, which is best suited to portability. Various techniques from the formation of microelectronics may be used, such as lithography, thin film deposition, electrochemical processing, and microfluidic processing methodologies. These techniques may be used to enable large scale manufacturing of electrochemical cells designed in accordance with the present invention.

Preferably, but not necessarily, an electrochemical cell constructed in accordance with this invention, including any embodiment described above or below, may be used in portable applications, such as for powering laptops, cell phones, portable audio players, wireless e-mail devices, medical equipment, or any other device for which portability by a person is desirable. However, it should be understood that the present invention may be practiced on larger scale, non-portable devices, and the advantage of portability is not intended to be limiting. To the contrary, the present invention is not limited to portability, but it is believed to be particularly useful for achieving portability. The electrochemical cell 10 may be configured as a metal-air battery. It may also be used in automotive applications or as a back-up power supply.

In the preferred embodiments of the invention, the metal fuel may be collected at the first electrode 14 by electrodeposition. In such an approach, the first electrode 14 body's potential is changed so that it acts as a cathode for the reduction of the fuel ions, thus causing fuel cations (i.e., reducible ion species of the metal fuel) in the electrolyte to be electrodeposited on the first electrode 14 body. Thus, the first electrode 14 body may be broadly characterized as being a permeable body, which includes any body on which the fuel can collect.

The foregoing description of a metal fueled cell is for reference only and is not intended to be limiting. The present invention, and particularly the electrodeposition technique described below, may be used in a variety of different cell arrangements, including, for example, a cell in which the flow is in a direction parallel to the first electrode 14 and second electrode 12, a cell in which there is no flow at all, a set for cells connected in electrical and/or fluid series, etc. The following description of an electrodeposition technique on the first electrode 14 may be used in the above-identified or any other type of cell, including embodiments where the first electrode is a single body.

This electrodeposition approach may be used advantageously in certain embodiments, where the reaction between the oxidized fuel ions and the reduced oxidizer ions to form the by-product is reversible. For example, in the embodiment discussed above using zinc as the fuel, the zinc oxide by-product may be allowed to accumulate and remain in the electrolyte 18 as a suspension or colloid during operation (or under some conditions the by-product may remain as zincate ions in the electrolyte 18). Then, to re-charge the first electrode 14 body with the zinc fuel, a cathodic potential can be applied to the first electrode 14 body (which is now acting as a cathode), to cause the zinc cations (i.e., the reducible zinc fuel ions) from the zinc oxide and/or zincate ions to be reduced are deposited on the first electrode 14 body(ies). An additional electrode that acts as an anode when the cathodic potential is applied to the first electrode 14 body may also be used. With the ability to discharge and re-charge, the cell may be used as a re-chargeable battery power supply or a re-chargeable back-up power supply.

FIGS. 2-10 are related more specifically to the electrodeposition of metal fuel on the first electrode 14 (i.e., the electrode that functions as the anode during current generating/discharge operation of the cell). The electrodeposition methodology aspect of this disclosure may be used in any type of electrochemical cell, and is not limited to the type of cell described above where the electrolyte flow supports the power generation of the cell. Thus, although the methodology is described with reference to the Figures depicting such a cell, the description and Figures herein are not intended to be limiting. The electrodeposition methodology described has particular advantages in such a cell, as discussed below. Where the same reference numbers are used between FIGS. 2-10 and FIG. 1, it should be understood that similar structures are being referred to, and it is not necessary to repeat the description of those structures herein with reference to FIGS. 2-10.

Figure 2:
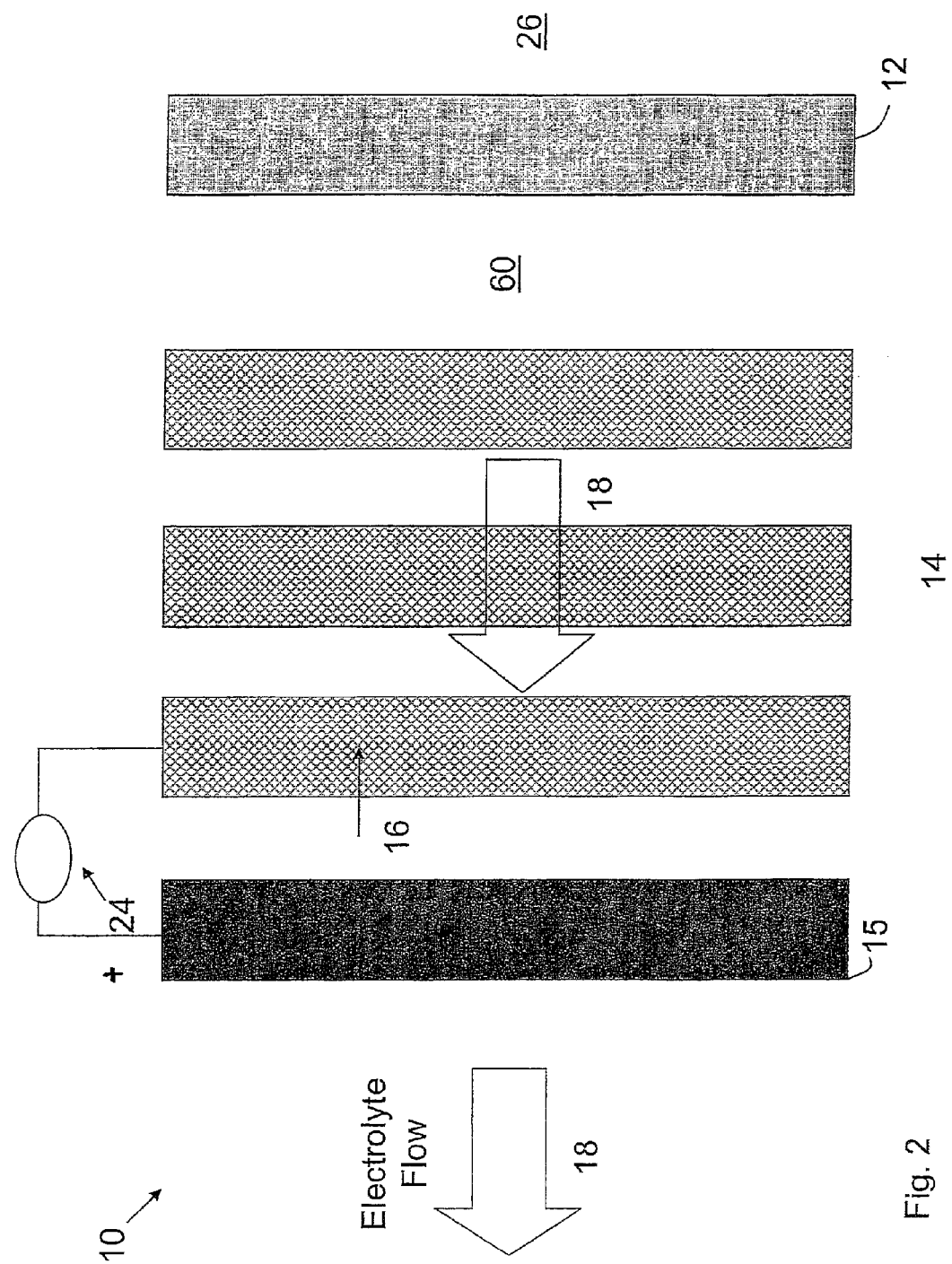
FIG. 2 is a schematic view of an electrochemical cell with a stack of permeable electrode bodies for charging with electrodeposited fuel growth thereon.

FIG. 2 shows the electrochemical cell 10 schematically and in somewhat exaggerated dimensions in the same manner as FIG. 1 so the various workings can be better appreciated. This is not intended to be limiting, and is merely for illustrational purposes. As can be seen in the FIG. 2, the electrochemical cell 10 also includes a charging electrode spaced apart from the first electrode 14. In the illustrated embodiment, the charging electrode is a third electrode 15 spaced apart from the first electrode 14 on the side opposite of the second electrode 12. In some embodiments, the third electrode 15 may be spaced apart from the first electrode 14 on the same side as the second electrode 12, such as by being in the gap 60. However, in some embodiments, the second electrode 12 may be used during charging as the charging electrode, and the presence of a separate electrode dedicated to charging is not necessary. In the illustrated embodiment, a separate charging electrode 15 is used because some electrodes suitable for function as an air breathing cathode do not perform well in the anodic role of a charging electrode for evolving oxygen. However, the invention is not intended to be limiting, and it is possible to select a second electrode 12 that is bi-functional, meaning that it can perform both the role of an air breathing cathode during current generation and the role of an anodic charging electrode during charging. Thus, any reference herein to a charging electrode may be regarded as applying either to the second electrode 12 or a third electrode 15 that acts or functions as the anode during charging. More specifically, while the illustrated embodiment is described with reference to the charging electrode as a third electrode 15, it should be understood that the same description could be used where the second electrode 12 is the charging electrode.

In an embodiment, the permeable bodies of the first electrode 14 may be separated by inert, non-conductive separators. Such separators are designed to maintain separation and electrical isolation between the permeable electrode bodies 14. Such separators would typically be provided about the periphery of the permeable electrode bodies 14, so that they are exposed to one another within the open interior of the separators. As an option, the separators may also include structures in this interior region to help maintain the separation of the permeable electrode bodies 14 without significantly impeding flow of electrolyte 18 therethrough. As another non-limiting option, the separators may also include structures, such as a latticed arrangement, in this interior region to assist and direct the growth morphology of the metal fuel deposition, which is described further below. The morphology can resemble, for example, dendrites. However, the use of separators is optional, and other ways of maintaining separation of the permeable electrode bodies 14 may be used, such as rigid or fixed mounting points to the surrounding structure that maintains the separation.

In an embodiment, the electrochemical cell 10 may comprise one or more return channels communicated to the gap 60. But this is not necessary. In particular, in flow-based cells where the flow is parallel to the first electrode 14 and second electrode 12, the flow may simply enter one side and exit the other via ports, and there is no need for return channels.

Charging the electrochemical cell is performed by flowing the electrolyte 18 comprising the reducible metal fuel ions along the flow path through the permeable electrode bodies 14. The reducible metal fuel ions may be present in the electrolyte 18 in any suitable form, such as in ionic, atomic, molecular or complexed form. Typically, the reducible metal fuel ions will be the oxidized fuel ions liberated from the metal fuel on the first electrode 14 during discharging, such as the $Zn^{2+}$ ions present in the zincate ions or zinc oxide when zinc is oxidized as the metal fuel.

As can be seen in FIG. 2, in one possible embodiment during charging, the electrolyte 18 flow may be reversed from the current generating direction shown in FIG. 1, as described above. As a result, the flow runs in a direction from the first electrode 14 towards the charging electrode 15. As is discussed below, this is an optional approach with its own benefits, and it is also within the scope of the invention to keep the flow in the same direction as during current generation (which may, for example, be the case where the second electrode 12 is used as the charging electrode, or where the charging electrode is a separate electrode on the same side as the second electrode 12, such as in the gap 60). In other embodiments, such as where the flow is parallel to the first and second electrodes 12, 14, the flow direction is immaterial; and in other embodiments there may be no flow at all.

While the electrolyte 18 comprising the reducible metal fuel ions is flowing through the permeable electrode bodies 14, an electrical current from an external power supply 24 is applied between the charging electrode 15 and a terminal permeable electrode body 14, with the charging electrode 15 acting or functioning as an anode and the terminal permeable electrode body 14 acting or functioning as a cathode. For example, if the cell is part of a power storage battery for a solar cell or wind farm, the power source may be the current output of the solar cells/wind turbines. Similarly, if the cell is a vehicle battery, the power source may be grid power from a re-charging station, or current generated by regenerative braking. As a result, the reducible metal fuel ions are reduced and electrodeposited as metal fuel in oxidizable form on the terminal permeable electrode body 14. In the illustrated embodiment, the terminal permeable electrode body 14 is the electrode body proximate the charging electrode 15. While this is preferred in the context of the illustrated embodiment, in other arrangements a different one of the permeable electrode bodies 14 may serve as the terminal permeable electrode body, as discussed below.

In one non-limiting embodiment, the metal fuel is zinc and the electrolyte 18 is an aqueous solution containing potassium hydroxide (KOH), which can be the same fuel and electrolyte 18 used in the above-described embodiment. In the electrolyte 18, the zinc ions may be provided in any suitable reducible form, and preferably in the form of zinc oxide (ZnO). This is advantageous, as zinc oxide is the by-product of the current generating operation described above with regard to the prior embodiment, and thus the electrochemical cell 10 can be re-charged using the reversible by-product of its own current generating operation. This can minimize the need to supply the fuel from a fresh source for each charging, as the current generating operation has already created the reducible zinc oxide in the electrolyte 18. In such an embodiment, the reduction reaction occurs as follows at the reduction site:

$$ZnO + H_2O + 2e^- \rightarrow Zn + 2OH^-; \quad (4)$$

where the corresponding oxidation occurs at the charging electrode 15 acting or functioning as an anode (also referred to as an oxygen evolving electrode) as follows, oxidizing the oxygen species to produce oxygen gas that may optionally be off-gassed in any suitable manner $$2OH^- \rightarrow 2e^- + \tfrac{1}{2}O_2 + H_2O. \quad (5)$$

However, the fuel need not be limited to zinc, and any other metal fuel, including any of those mentioned above in this application, may also be used. Likewise, the electrolyte 18 may be different, and may be alkaline or acidic in various embodiments. Also, it is not necessary that the reducible metal fuel ions be provided by the by-product of the current generating operation, and it is within the scope of the invention to use fuels in some embodiments that create by-products that are not readily reversible. Thus, it is within the scope of the invention that the electrolyte 18 used for charging be supplied from a separate fuel source with the fuel ions in a suitable form for reduction and electrodeposition, which fuel source is separate from the electrolyte 18 used during current generation and which accumulates the by-product. Likewise, the same electrolyte 18 could be used in both processes, but the fuel could be provided separately from its own source during re-charging.

During the charging step, the electrodeposition can cause or promote growth of the metal fuel in a flow permeable morphology among the permeable electrode bodies 14, such that the electrodeposited metal fuel establishes an electrical connection between the terminal permeable body and each subsequent permeable electrode body 14. As a result of this growth, the reduction and the electrodeposition occur on each subsequent permeable electrode body 14 upon the establishment of the electrical connection.

By flow permeable morphology, this term means that the morphology of the metal growth among the electrode bodies 14 is configured such that the electrolyte 18 is still able to flow through the electrode bodies 14. Thus, the flow is allowed to continue, and the growth does not exhibit dominant lateral characteristics that would cause complete clogging or blocking of the pores or openings of the permeable electrode bodies 14. The flow permitted may be in any direction. It is also possible to have the growth occur without any flow, although flow is preferred.

Preferably, the growth may occur as a generally uniform plating growth, as described below. With a generally uniform plating growth, it is preferable that the distance between the permeable electrode bodies 14 be less than that of the pores or openings in the bodies, such that the growth in the direction between the adjacent bodies 14 establishes contact between the adjacent bodies before lateral growth closes the pores or openings. However, it is also possible for the flow to provide some directionality to the plating growth so that this spacing is not necessarily a critical factor.

In the illustrated embodiment wherein the first electrode 14 comprises a plurality of permeable electrode bodies, the fuel is initially electrodeposited on and begins its growth on the terminal permeable electrode body 14 proximate to the charging electrode 15. This is because that electrode body 14 is connected to the negative terminal of power supply 24, and has a cathodic potential that causes the reduction of the fuel ions and electrodeposition of the fuel thereon (while the charging electrode 15 is connected to the positive terminal of the power supply and functions as the anode). In contrast, the remaining electrode bodies 14 are initially inactive and do not function as a reduction site because they are not connected to the power supply 24. The growth may continue with the metal growing from the terminable permeable electrode body through each successive permeable electrode body 14. This may then establish an electrical connection between each successive permeable electrode body 14, which in turn causes each successive permeable electrode body 14 to now also have the cathodic potential applied to it.

This growth may continue and thereby establish an electrical connection between the permeable electrode bodies 14, such that the plurality of permeable electrode bodies 14 now has the cathodic potential applied to it. In other words, the growth can be a body-by-body progressive growth, as described in U.S. patent application Ser. No. 12/385,489, which is hereby incorporated by reference in its entirety. In one embodiment, the plurality of electrode bodies 14 and the growth of metal fuel can be a stepped scaffold, as described in U.S. Patent Application Ser. No. 61/358,339, which is hereby incorporated by reference in its entirety. Alternatively, the electrode bodies and the metal fuel growth can be multi-mode charging, as described in U.S. Patent Application Ser. No. 61/414,579, which is hereby incorporated by reference in its entirety. In other words, if there are N multiple electrode bodies 14, at least some (i.e., one or more) of these bodies can be connected to an anodic potential from an external power source to function as the charging electrode (with the others being connected to a cathodic potential for receipt of electrodeposited fuel to function as the first or fuel electrode). When the anodic potential is applied to the second to the Nth electrode bodies (or possible fewer, such as just the second body), the charging can comprise connecting and disconnecting each of the electrode bodies and the charging electrode individually in order. For example, the second electrode body is connected to the anodic potential, then is disconnected, and thereafter the third electrode body is connected to the potential, and so on the growth connects the charging electrode to reach completion. This type of charging electrode may be referred to as dynamic, as the physical body or bodies constituting the charging electrode charges dynamically as the bodies are connected/disconnected.

Thus, as can be appreciated from the fact that in some embodiments the same physical component or parts thereof can play different electrode functions, when electrodes are referred to herein, it should be understood that various structures in the same embodiments may function as one or more electrodes in different ways depending on the operational mode of the device. For example, in some embodiments where the oxidant electrode is bi-functional as a charging electrode, the same electrode structure acts as an oxidant electrode during discharging and as a charging electrode during discharging. Similarly, in the embodiment where the charging electrode is a dynamic charging electrode, all of the bodies of the fuel electrode act as the fuel electrode during discharging; but during charging one or more of those bodies act as the fuel electrode by receiving electrodeposited fuel and one or more other of the bodies act as the charging electrode to evolve the oxidant (e.g., oxygen gas), and the fuel electrode grows as the electrodeposited growth connects to more of the bodies. Thus, reference to an electrode is expressly defined as either a distinct electrode structure or the functional role a structure capable of multiple electrode functions may play during different operational modes of the cell (and thus the same multi-functional structure may be considered to satisfy multiple electrodes for this reason).

Generally, at any given time the majority of the metal fuel growth will be associated with the last (i.e., most recent) electrode body to which the cathodic potential has been applied. That is, in the illustrated embodiment where the electrolyte 18 is flowing orthogonally through the permeable electrode bodies 14, it will be associated with the cathodic electrode body that is the furthest upstream with respect to the electrolyte flow. Not to be bound by any particular theory, but it is believed that this occurs because the concentration of fuel ions is greater upstream, and thus many of the fuel ions will be reduced from the electrolyte 18 at the first cathodic electrode encountered, which in turn makes fewer ions available for reduction and deposition on the subsequent electrode bodies downstream (i.e., towards the terminal electrode body 14). Thus, in FIG. 2 once an electrical connection has been established with the final permeable electrode body 14 causing it to have a cathodic potential, the majority of reduction can occur on said permeable electrode body 14. Likewise, some reduction and electrodeposition may be associated with the prior permeable electrode body 14 and its growth formations, but this will be to a lesser extent because the concentration of available ions will be less. Likewise, progressively lesser reduction and electrodeposition will be associated with permeable electrode bodies 14 proximate to the charging electrode, as illustrated, and their growth formations, with the most proximate permeable electrode body 14 experiencing the least. This progressively decreasing growth gradient is beneficial, as it allows the largest amount of reduction and electrodeposition to occur at the freshest reduction site, but allows some continued electrodeposition to occur downstream at the prior reduction sites to increase their density (but preferably not so much that the flow therethrough is impeded). This progressive density of the growth should not be regarded as limiting.

In the illustrated non-limiting embodiment, the growth pattern is relatively atypical and worth noting. Generally, when re-charging an electrochemical cell, growth morphologies tend to grow from the cathode (i.e., the permeable electrode bodies) towards the anode (i.e., the charging electrode 15). However, in the illustrated embodiment, the flow rate, fuel ion concentration, and the external current from the power supply 24 (and more particularly the potentials it applies to the permeable electrode bodies 14 and the charging electrode 15) may be controlled such that the growth direction is reversed. Without being limited to any specific scientific theory, it is believed that the use of a flow towards the charging electrode 15 enables diffusion limited aggregation to dominate the general tendency for the growth to occur towards the charging electrode 15 (i.e., the anode during charging). With diffusion limited aggregation, the tendency is for the electrodeposition growth to occur in the direction of the concentration gradient of the reducible fuel ions. In the illustrated embodiment, because those ions are being reduced as the electrolyte 18 flows over the reduction sites established by the cathodic potential at the respective permeable electrode bodies 14, the concentration of ions in the electrolyte 18 on the upstream side (i.e., away from the charging electrode 15) is greater than on the downstream side (i.e., towards the charging electrode 15). Thus, by maintaining an appropriate flow rate and concentration in relation to the potential difference, the differential in concentration upstream and downstream of the reduction sites can be manipulated to establish the growth of the electrodeposited metal in the direction away from the charging electrode 15, thus dominating over the general tendency for the growth to occur in the direction towards the charging electrode 15.

The parameters governing this particular growth pattern may vary as they are interrelated. Because all these factors are in competition and no single one of them overwhelmingly dictates the final growth pattern, they may be varied and adjusted with respect to one another to achieve the desired growth in the direction away from the charging electrode 15, so that the stack of electrode bodies can be charged with the electrodeposited fuel.

An unexpected advantage of achieving growth in this manner is that the competition between growth directions may allow the growth to occur more slowly among the permeable electrode bodies 14 so that it occurs more densely as the growth proceeds among them.

It is also within the scope of the invention to alter the arrangement and have the permeable electrode body 14 distal from the charging electrode 15 be the terminal electrode body. In such an arrangement, the desired growth direction would be towards the charging electrode 15, rather than away from it. In such a situation, it is possible to reverse the flow so that it flows away from the charging electrode 15 (i.e., in the normal current generating direction of the illustrated embodiment running, in relation to the charging electrode 15, from the proximate permeable electrode body 14 to the distal permeable electrode 14). In this arrangement, the growth of the fuel towards the charging electrode 15 would be dominant, both because of the natural tendency for metal to grow towards the charging electrode 15 due to its anodic potential, and because the concentration of fuel ions would be greater on the upstream side towards the charging electrode 15. Eventually, the growth on the last electrode body closest to the charging electrode 15 may reach to the charging electrode 15, thus shorting the circuit and indicating completion of the growth. While this is possible and is within the broad scope of the invention, the growth may occur very rapidly because there is little or no competition in the opposite direction, and the resulting growth morphology may be less dense. More specifically, because the growth will occur more rapidly, the connections between the permeable electrode bodies 14 will be established more rapidly, and thus the growth between each set of permeable electrode bodies 14 will tend to be less dense. This may be desirable in certain embodiments.

As mentioned above, it is also possible to have the charging electrode be either the second electrode 12, or a separate third electrode 15 on the same side as the second electrode 12, such as in the gap 60. In this case, the permeable electrode body 14 distal from the charging electrode 12 or 15 may be used as the terminal electrode body for charging purposes, and the flow may run in the direction from the first electrode 14 towards the charging electrode 12 or 15. In such an approach, it would be preferable for the potential difference to be the dominant factor in the directionality of the electrodeposition, such that the flow permeable growth grows from the permeable electrode body 14 distal from the charging electrode 15 to the permeable electrode body 14 proximate to the charging electrode 15. Some competition from the tendency for growth to occur in the direction of the concentration gradient (i.e., upstream) in such an arrangement may beneficially enhance the growth density. Alternatively, the flow may be reversed to run through the first electrode 14 away from the charging electrode 15 so that both the potential and the concentration gradient can contribute to the directionality of the growth in that direction.

Likewise, where the charging electrode is either the second electrode 12 or a separate electrode 15 on the same side as the second electrode 12, the permeable electrode body 14 proximate to the charging electrode 12 or 15 may, be used as the terminal electrode body for charging purposes, and the flow may run in the direction from the first electrode 14 towards the charging electrode, which is the same as the normal current generating direction. In this approach, the dominant factor in the directionality of the electrodeposition may be the concentration gradient as discussed above, such that the flow-permeable growth is away from the charging electrode 12 or 15. The density achieved by competition between the potential driven tendency to grow towards the charging electrode and the concentration driven tendency to grow upstream in the flow would be present here.

In other embodiments, it is possible to provide for bi-directional charging of the first electrode 14. For example, at one or more times during the charging, the electrolyte 18 flowing in the direction from the first electrode 14 towards the charging electrode 15 may be reversed to flow in the opposite direction (i.e., from the charging electrode 15 towards the first electrode 14). As a result, both types of growth may be achieved, thus providing bi-directional growth of the metal fuel both towards and away from the charging electrode 15. Such an approach may be used with the terminal electrode body being any one of the permeable electrode bodies 14, including any intermediate permeable electrode body 14. Thus, the broadest aspects of the invention are not intended to be limited to uni-directional growth.

As mentioned before, it is possible to practice this multiple electrode body deposition technique in a cell with flow that is parallel to the electrodes rather than orthogonally through them, or in a cell with no flow at all. In such embodiments, it would be preferable for the terminal permeable electrode body 14 to be the one distal from the charging electrode 15 (i.e., the electrode acting or functioning as the anode during re-charging) so that the growth towards the charging electrode progresses through the plurality of permeable electrode bodies 14 by its natural tendency to grow towards the anodic potential.

It is also possible in any of the embodiments of the invention to apply the cathodic potential simultaneously to all the permeable electrode bodies of the first electrode 14, rather than to just one to produce body-by-body progressive growth. Progressive growth emanating from one terminal is advantageous because it provides more density. Specifically, the growth in the previously connected electrode bodies continues as each subsequent body is connected by the progressing growth. However, progressive growth takes more time than applying the cathodic potential to multiple electrode bodies simultaneously. With all the electrode bodies subject to the same potential, the growth will only occur until a short occurs between the charging electrode 12/15 and the electrode body proximate to it. Thus, it is possible to have a faster, but less dense, growth in this manner, which may be amenable to certain re-charging needs.

The electrode locations and connections and flow directions described herein are not intended to be limiting, and other arrangements may be used.

To complete the charging, the electrical current is then removed to discontinue the charging. Once the charging is completed, the cell may be used to generate electrical current. The cell may be operated in any manner, including as described above with respect to the prior embodiment. The metal fuel is oxidized on the permeable electrode bodies 14 of the first electrode 14 acting or functioning as an anode, and an oxidizer is reduced at the second electrode 12 acting or functioning as a cathode. As a result, electrons are generated for conduction from the first electrode to the second electrode via an external load 22, and the oxidized fuel ions and reduced oxidizer ions react to form a by-product in the electrolyte 18. Preferably, as described above, the electrolyte 18 flows through the permeable electrode bodies 14 of the first electrode 14 and towards the second electrode 12 across the gap 60 to transport at least the electrolyte 18 and the oxidized fuel ions away from the first electrode 14 and towards the second electrode 12. In an embodiment, the electrolyte 18 and the oxidized fuel ions then flow through one or more return channels to transport at least the electrolyte 18 and the by-product formed by the reaction of the oxidized fuel ions and the reduced oxidizer ions away from the gap 60. While it is preferred that the current generation occur with the electrolyte 18 flowing through the flow path as described with regard to the prior embodiment, it is within the scope of the invention to use the charging method described above with any type of electrochemical cell, including one with parallel flow or one that does not rely on flow to assist in the current generation.

In another embodiment, each of the permeable electrode bodies 14 in the stack is coupled to the external load 22. Using such an approach is desirable, as during power generation (i.e., discharge), oxidization may be occurring throughout the stack, thus liberating electrons for conduction to the external load 22. By connecting terminals for current collection purposes to all the permeable electrode bodies 14, these electrons can be collected directly from each electrode body. Moreover, this arrangement is desirable because it still allows for current collection from oxidation reactions on-going at electrode bodies that have become "disconnected" from the other electrode bodies by consumption of the growth between the bodies. Such a condition may occur during power generation or discharge based on various factors. In some embodiments, this may be preferred over using a single terminal for purposes of connection to the external load 22, as discussed above.

For further details regarding the cell architecture and the charging/discharging processes and controls for the same, reference may be made to U.S. patent application Ser. No. 12/385,489, filed Apr. 9, 2009, the entirety of which is incorporated herein by reference.

As discussed above, during charging, the electrodeposition causes growth of the metal fuel in a flow permeable morphology among the permeable electrode bodies 14. If the growth occurs very rapidly, the resulting growth morphology may be less dense. Yet, the more dense the electroplating of the metal fuel on the first electrode 14, the more fuel is available when the electrochemical cell 10 operates to generate current as described in an embodiment above. Thus, one aspect of this invention discloses an improvement to the metal fuel plating/electrodeposition.

One measure of the effectiveness of the metal fuel electrodeposition on the first electrode 14 is overpotential. An embodiment of the present invention adds an additive, poly(ethylene glycol)tetrahydrofurfuryl, to the electrolyte 18, and the additive may reduce an increased electrochemical cell 10 overpotential.

Figure 3:
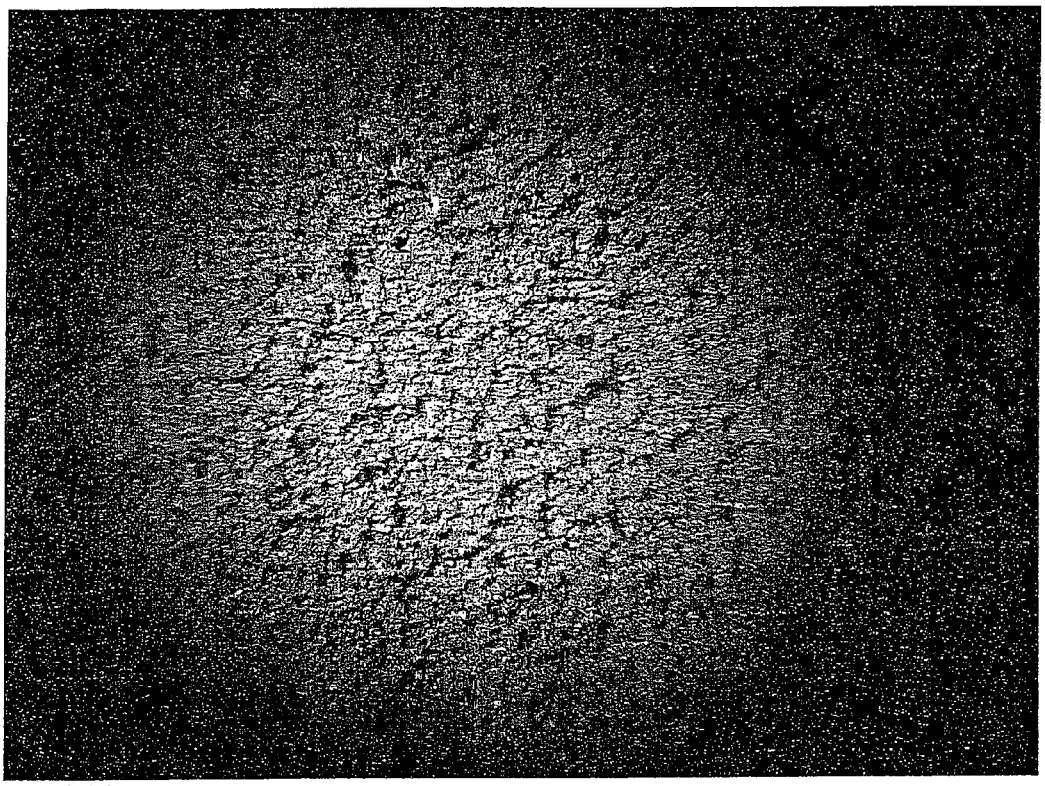
FIG. 3 shows electrodeposition at the interface between an electrolyte and an electrode in the stack of permeable electrode bodies, wherein the electrolyte does not include an additive.
Figure 4:
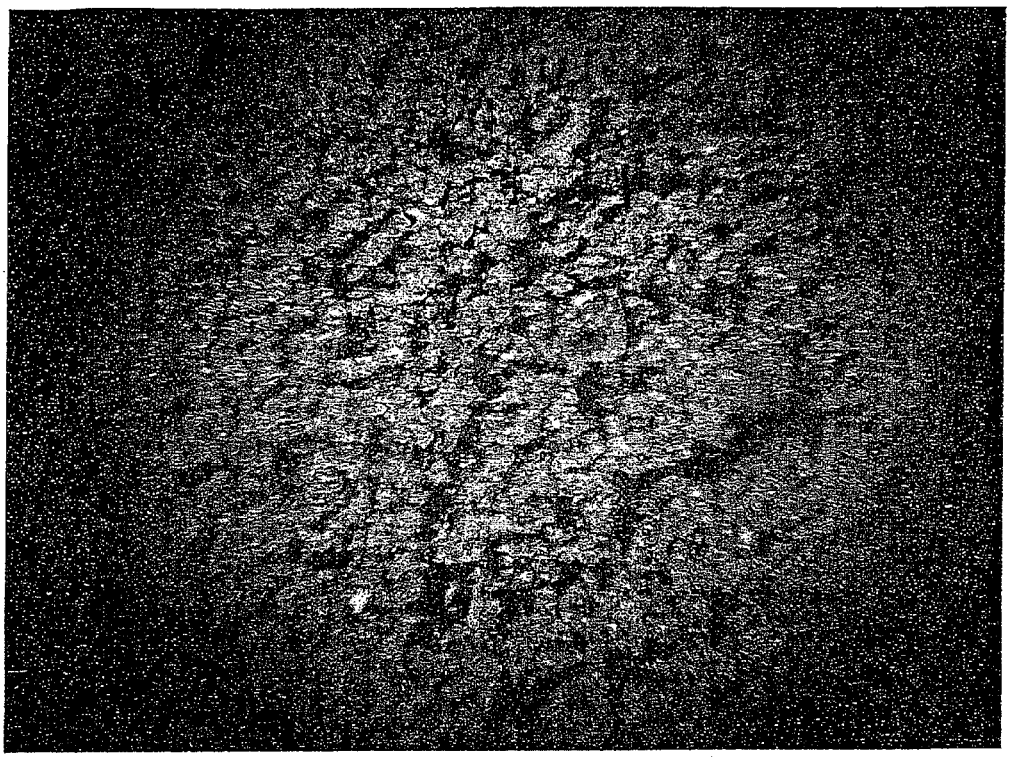
FIG. 4 shows a closer view of electrodeposition at the interface between an electrolyte and an electrode in the stack of permeable electrode bodies, wherein the electrolyte does not include an additive.

In an example of an electrochemical cell 10, a current density of 70 mA/cm$^2$ was applied to the first electrode 14 in a solution 9M KOH/0.7M ZnO with no additive. Cell potentials measured at room temperature and at 60° C. were 2.58V and 2.41V, respectively. FIGS. 3 and 4 show the resulting zinc growth on screens of the first electrode 14. In this case, the metal fuel growth is rough and uneven with poor density. Also, the growth loosely covers the screen.

Figure 5:
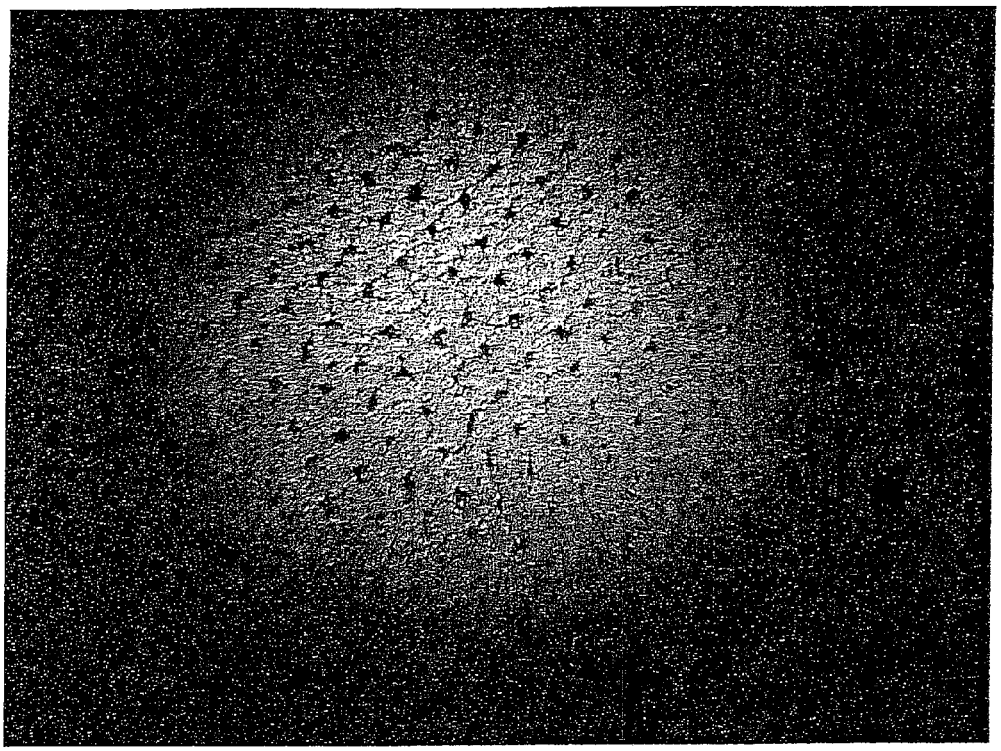
FIG. 5 shows electrodeposition at the interface between an electrolyte and an electrode in the stack of permeable electrode bodies, wherein the electrolyte includes the additive, poly(ethylene glycol)-Diacid (250)
Figure 6:
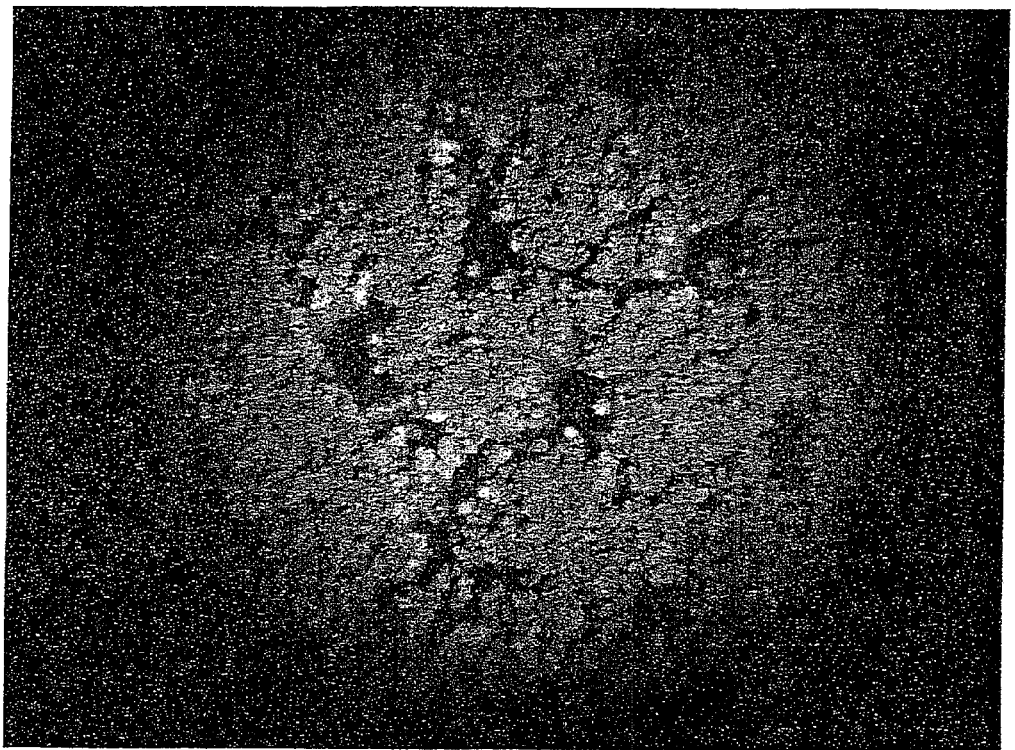
FIG. 6 shows a closer view of electrodeposition at the interface between an electrolyte and an electrode in the stack of permeable electrode bodies, wherein the electrolyte includes the additive, poly(ethylene glycol)-Diacid (250)

In another example of an electrochemical cell 10, a current density of 70 mA/cm$^2$ was applied to the first electrode 14 in a solution 9M KOH/0.7M ZnO with an additive, poly(ethylene glycol)-Diacid 250, added to the electrolyte 18 at a concentration of 2 mL/L. The cell potential measured at 60° C. was 2.6V. FIGS. 5 and 6 show the resulting metal fuel growth on screens of the first electrode 14. In this case, the zinc growth is slightly more dense and uniform as compared to the growth presented in FIGS. 3 and 4. The electrolyte 18 flow may not be as blocked as presented in FIGS. 2 and 3, but the metal fuel growth may eventually occlude the screen completely.

Figure 7:
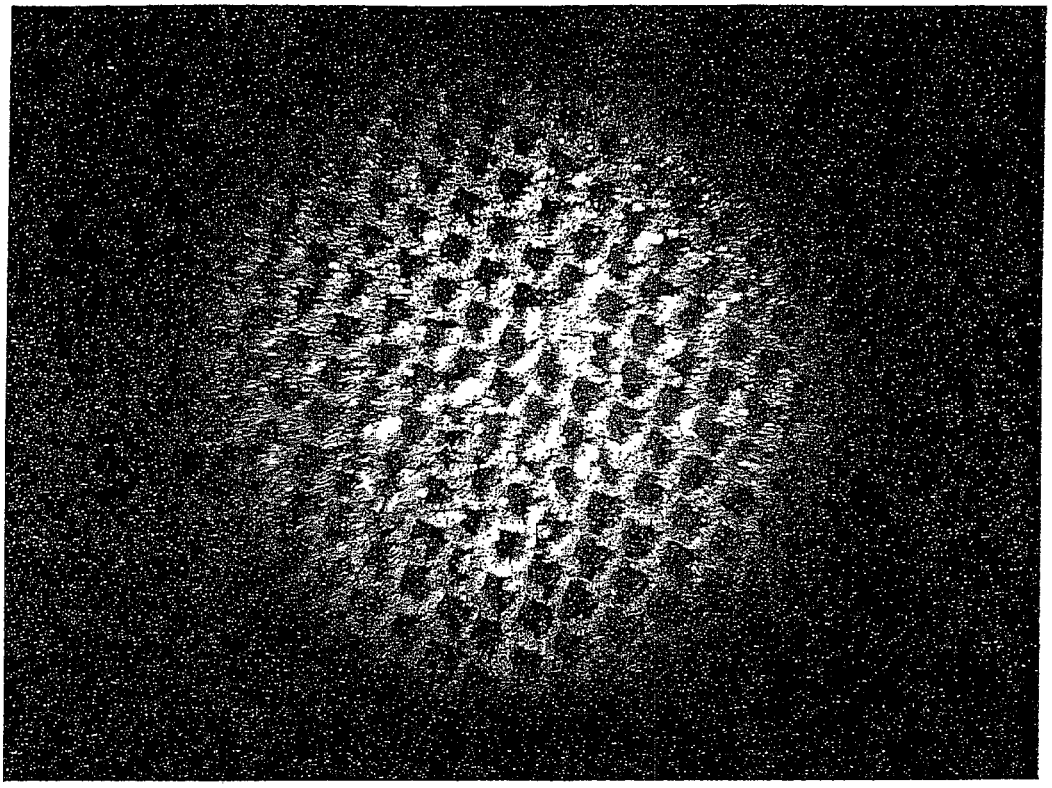
FIG. 7 shows electrodeposition at the interface between an electrolyte and an electrode in the stack of permeable electrode bodies, wherein the electrolyte includes a commercial non-poly(ethylene glycol)-based additive.
Figure 8:
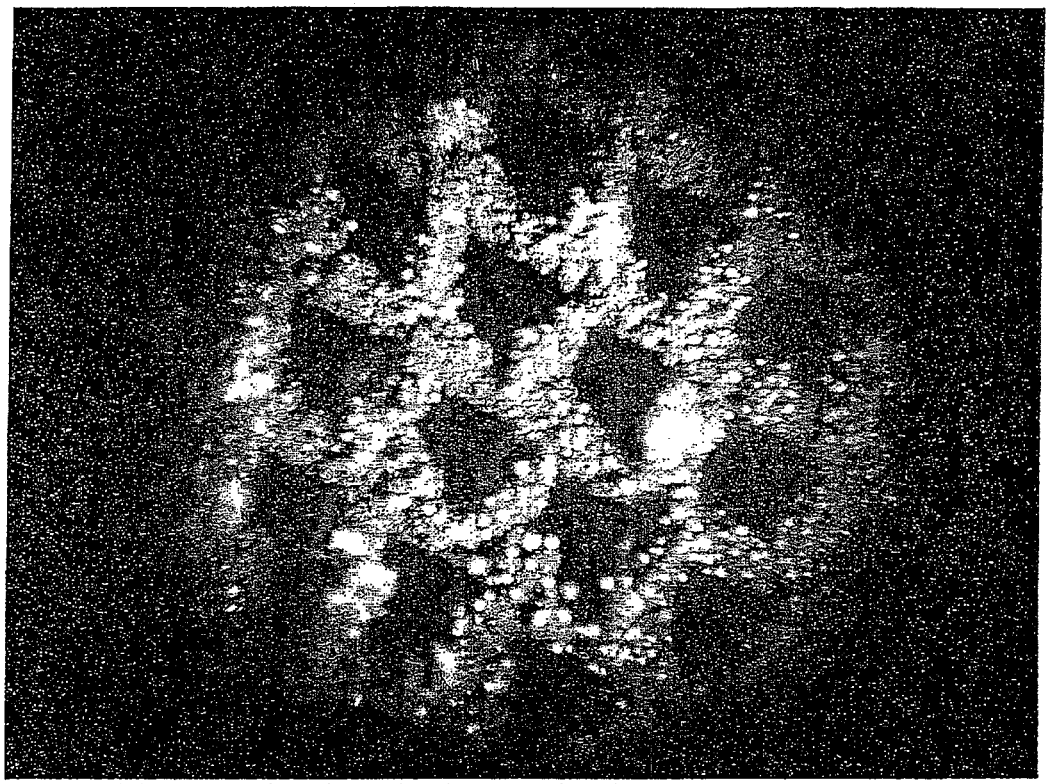
FIG. 8 shows a closer view of electrodeposition at the interface between an electrolyte and an electrode in the stack of permeable electrode bodies, wherein the electrolyte includes a commercial non-poly(ethylene glycol)-based additive.

In another example of an electrochemical cell 10, a current density of 70 mA/cm$^2$ was applied to the first electrode 14 in a solution 9M KOH/0.7M ZnO with a commercial non-poly(ethylene glycol) based additive added to the electrolyte 18 at a concentration of 2.5 mL/L. The additive was Ultra-Alk CR, from Electrochemical Products, Inc. Cell potentials measured at room temperature and at 60° C. were 2.96V and 2.85V, respectively. FIGS. 7 and 8 show the resulting metal fuel growth on screens of the first electrode 14. In this case, the zinc growth is more dense and more uniform as compared to the growth presented in FIGS. 5 and 6. Yet, the large increase in the potential across the cell as compared to the example with no additive in the electrolyte 18 means that more energy from the external power source 24 will be required to plate the screens to a given capacity.

Figure 9:
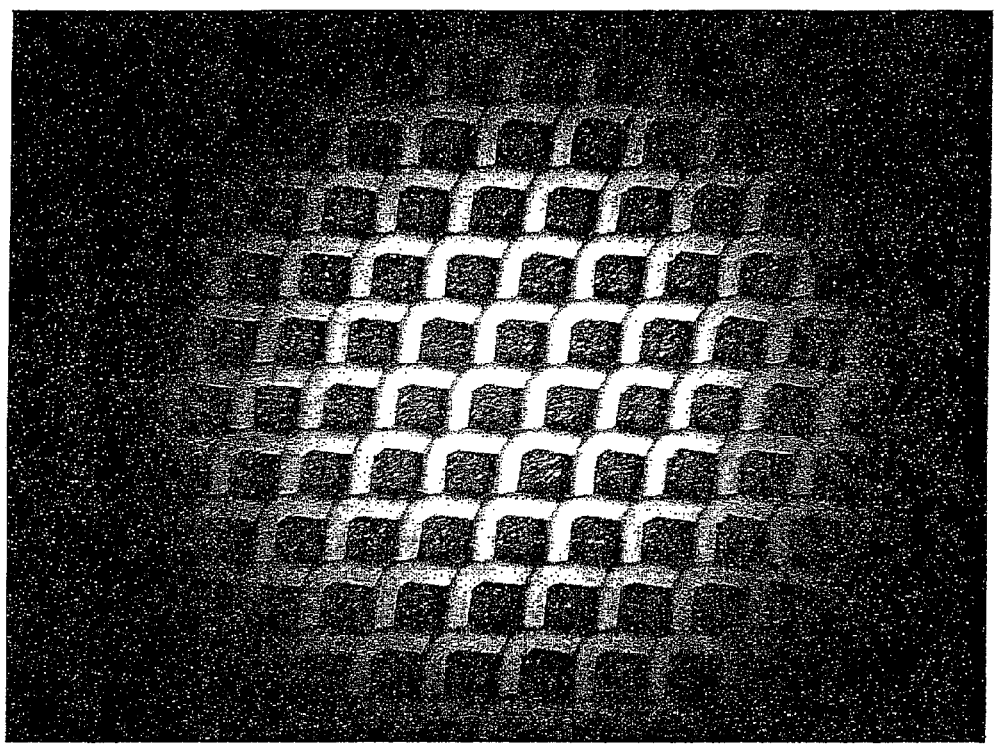
FIG. 9 shows electrodeposition at the interface between an electrolyte and an electrode in the stack of permeable electrode bodies, wherein the electrolyte includes the additive, poly(ethylene glycol)tetrahydrofurfuryl.
Figure 10:
FIG. 10 shows a closer view of electrodeposition at the interface between an electrolyte and an electrode in the stack of permeable electrode bodies, wherein the electrolyte includes the additive, poly(ethylene glycol)tetrahydrofurfuryl.

In a preferred embodiment of this invention, a current density of 70 mA/cm$^2$ was applied to the first electrode 14 in a solution 9M KOH/0.7M ZnO with an additive, poly(ethlyne glycol)tetrahydrofurfuryl ("PEG-THF"), added to the electrolyte 18 at a concentration of 2 mL/L. Cell potentials measured at room temperature and at 60° C. were 2.71V and 2.50V, respectively. FIGS. 9 and 10 show the resulting metal fuel growth on screens of the first electrode 14. In this case, the zinc growth is more dense, more uniform, and smooth as compared to the growth presented in FIGS. 3-8. And, the increase in potential across the electrochemical cell 10 is less than that measured when the commercial non-PEG-based additive was added to the electrolyte. In other words, the current invention of adding the PEG-THF to the electrolyte 18 results in the smoothest and most dense metal fuel dendrite growth, a lower increase in overpotential as compared to the other additives, and thus, a significantly more effective means to charge the electrochemical cell 10. The PEG-THF also has lower volatility and a lower rate of consumption during electrodeposition than the commercial non-PEG based additive.

The use of the PEG-THF additive is beneficial over a range of temperatures, concentrations, and current density ranges. For example, the temperature range of the electrolyte may be in the range of room temperature (20° C.) to 60° C. The concentration of PEG-THF in the electrolyte may be in the range of 0.5 mL/L to 4 mL/L, including 1.0 mL/L to 3.5 mL/L, 1.5 mL/L to 3.0 mL/L, and 1.75 mL/L to 2.5 mL/L The current density range may be in the range at or below 110 mA/cm$^2$. A preferred embodiment has a current density of 50 mA/cm$^2$ at a temperature of about 50° C. These ranges are examples and are not intended to be limiting.

Additionally, the higher the potential for a cell with an aqueous electrolyte, the more hydrogen evolution may occur. Without being limited to any mechanism of operation, it is believed that the PEG-THF additive's ability to cause plating at lower potentials than the commercial non-PEG based additive may result in less hydrogen evolution at the electrodeposition site. Since evolved hydrogen is a gas, it may "bubble" as the metal fuel is being electrodeposited, thus roughening the metal and lowering density. Thus, it is believed that the PEG-THF additive not only benefits the process by enabling electrodeposition to occur at a more energy efficient lower potential, but also by reducing potential detrimental effects of hydrogen evolution at the electrodeposition site.

Preferably, the PEG-THF additive is of low molecular weight (i.e., a low number of ethylene oxide units) to ensure adequate solubility in the aqueous electrolyte solution. In an embodiment, the PEG-THF additive may be limited to 2-5 ethylene oxide units. 2-3 ethylene oxide units are beneficial for highly alkaline electrolyte solutions in alkaline batteries. For example, the PEG-THF additive with 2-3 ethylene oxide units in concentrations in the range of 0.5 mL/L to 4.0 mL/L have been found to be highly effective at producing smooth, compact morphologies for zinc plating in a highly alkaline (e.g., 6-9 M KOH) solution.

Figure 11:
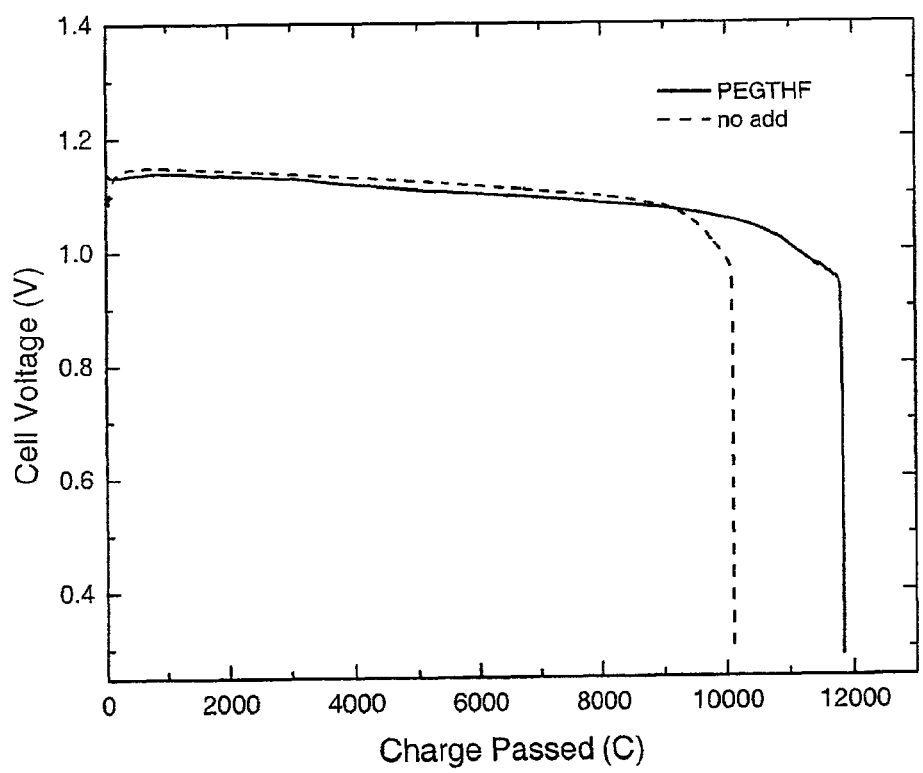
FIG. 11 shows a plot of cell voltage vs. total charge passed during oxidation of a zinc sheet at a current density of 50 mA/cm$^2$ in 8M potassium hydroxide both with (solid line) and without (dashed line) 1.5 mL/L of poly(ethylene glycol) tetrahydrofurfuryl, demonstrating a 17% increase in the capacity for zinc oxidation.
Figure 12:
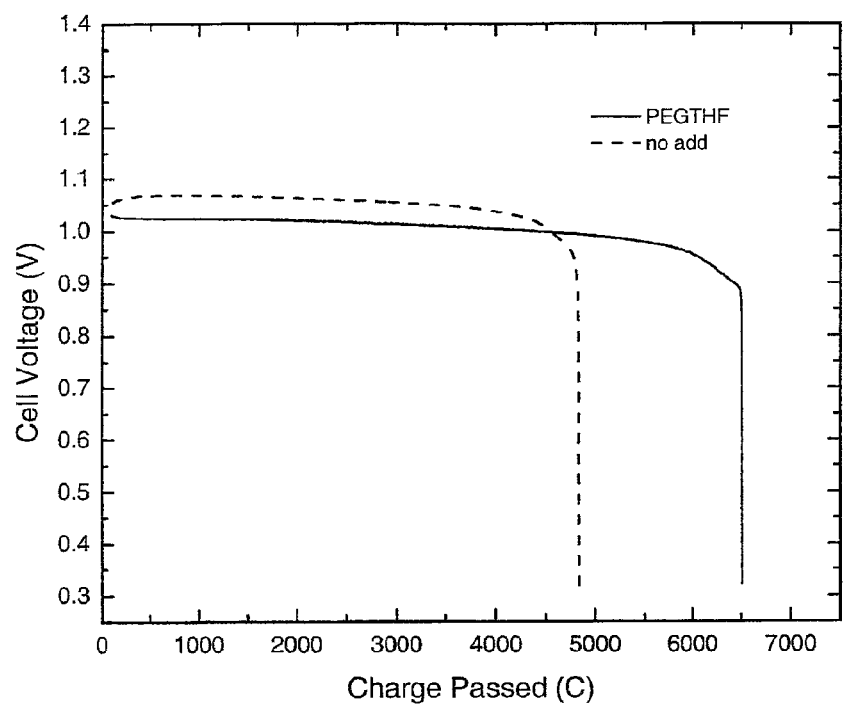
FIG. 12 shows a plot of cell voltage vs. total charged passed during oxidation of a zinc sheet at a current density of 100 mA/cm$^2$ in 8M potassium hydroxide both with (solid line) and without (dashed line) 1.5 mL/L of poly(ethylene glycol) tetrahydrofurfuryl, demonstrating a 35% increase in the capacity for zinc oxidation

In addition to this electrodeposition enhancement, the use of PEG-THF has also demonstrated the ability to increase cell capacity by delaying the on-set of passivation. For example, FIGS. 11 and 12 show plots of cell voltage vs. total charge passed during oxidation of a zinc sheet in an alkaline aqueous electrolyte solution with no additive (dashed lines) and with 1.5 mL/L of PEG-THF (solid lines). The electrolyte solution contained 8M potassium hydroxide. FIG. 11 demonstrates a 17% increase in capacity at a current density of 50 mA/cm$^2$ (capacity being the amount of charge passed in coulombs before the onset of passivation, denoted by the steep drop in voltage). FIG. 12 demonstrates a 35% increase at a current density of 100 mA/cm$^2$.

Thus, the PEG-THF additive not only improves physical density and/or efficiency as the zinc (or other metal) is being electrodeposited, it can also delay the onset of passivation to increase the total charge that can be extracted from the metal. This improves cell performance in both its charging and discharging aspects by enhancing the metal electrodeposition morphology/efficiency during charging and increasing the total charge extracted during discharging.

The use of the PEG-THF additive may have broad applicability in a wide variety of electrochemical cells. For example, it may be used in various metal fuel batteries, such as secondary metal fuel batteries. Also, it may be used in cells with a metal fuel electrode having a single body, rather than the multiple bodies described above. The PEG-THF additive may be useful for electrodeposition of any metal with high exchange current densities, such as zinc.

To maintain a desired or target level of the additive in the electrolyte solution, the additive modulator disclosed in U.S. Patent Application Ser. No. 61/378,021 may be used. The entirety of the application is incorporated herein by reference.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims The articles "a" and "an" are used herein to refer to one or to more than one (i.e., to at least one) of the grammatical object of the article. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed is:

1. A method for operating an electrochemical cell, wherein the cell comprises:
    a first electrode for oxidizing a metal fuel during discharging and reducing reducible ions of the metal fuel during recharging;
    a second electrode spaced apart from the first electrode for at least reducing an oxidizer during discharging;
    a charging electrode for oxidizing oxidizable ions of the oxidizer during recharging;
    an ionically conductive medium communicating the electrodes, the ionically conductive medium comprising the reducible metal fuel ions and an additive comprising poly(ethylene glycol)tetrahydrofurfuryl,
    wherein the method comprises recharging the electrochemical cell by:
        i. applying an electrical current between the charging electrode and the first electrode with the charging electrode functioning as an anode and the first electrode functioning as a cathode, such that the reducible metal fuel ions are reduced and electrodeposited as the metal fuel in oxidizable form on the first electrode; and
        ii. removing the electrical current to discontinue the charging.

2. A method according to claim 1, further comprising generating electrical current using the electrochemical cell by oxidizing the metal fuel at the first electrode functioning as an anode and reducing the oxidizer at the second electrode functioning as a cathode whereby electrons are generated for conduction from the first electrode to the second electrode via a load, and the oxidized metal fuel ions and reduced oxidizer ions react to form a by-product.

3. A method according to claim 1, wherein the charging electrode is selected from the group consisting of (a) the second electrode, (b) a third electrode spaced from both the first and second electrodes, and (c) one or more bodies of the first electrode wherein the first electrode comprises a plurality of spaced apart permeable bodies for receiving the metal fuel.

4. A method according to claim 2, wherein the ionically conductive medium is an aqueous electrolyte solution.

5. A method according to claim 4, wherein the aqueous electrolyte solution is alkaline.

6. A method according to claim 5, wherein the aqueous electrolyte solution comprises potassium hydroxide.

7. A method according to claim 1, wherein the poly(ethylene glycol)tetrahydrofurfuryl is in a concentration of 0.5 mL/L to 4.0 mL/L.

8. A method according to claim 4, wherein the poly(ethylene glycol)tetrahydrofurfuryl is in a concentration of 0.5 mL/L to 4.0 mL/L.

9. A method according to claim 5, wherein the poly(ethylene glycol)tetrahydrofurfuryl is in a concentration of 0.5 mL/L to 4.0 mL/L.

10. A method according to claim 6, wherein the poly(ethylene glycol)tetrahydrofurfuryl is in a concentration of 0.5 mL/L to 4.0 mL/L.

11. A method according to claim 1, wherein the poly(ethylene glycol)tetrahydrofurfuryl has 2-5 ethylene oxide units.

12. A method according to claim 4, wherein the poly(ethylene glycol)tetrahydrofurfuryl has 2-5 ethylene oxide units.

13. A method according to claim 5, wherein the poly(ethylene glycol)tetrahydrofurfuryl has 2-5 ethylene oxide units.

14. A method according to claim 6, wherein the poly(ethylene glycol)tetrahydrofurfuryl has 2-5 ethylene oxide units.

15. A method according to claim 7, wherein the poly(ethylene glycol)tetrahydrofurfuryl has 2-5 ethylene oxide units.

16. A method according to claim 8, wherein the poly(ethylene glycol)tetrahydrofurfuryl has 2-5 ethylene oxide units.

17. A method according to claim 9, wherein the poly(ethylene glycol)tetrahydrofurfuryl has 2-5 ethylene oxide units.

18. A method according to claim 10, wherein the poly(ethylene glycol)tetrahydrofurfuryl has 2-5 ethylene oxide units.

19. A method according to claim 1, wherein at least the recharging is performed between about 20° C. and 60° C.

20. A method according to claim 1, wherein the metal fuel is zinc and the reducible metal fuel ions are reducible zinc ions.

21. A method according to claim 5, wherein the metal fuel is zinc and the reducible metal fuel ions are reducible zinc ions.

22. A method according to claim 7, wherein the metal fuel is zinc and the reducible metal fuel ions are reducible zinc ions.

23. A method according to claim 9, wherein the metal fuel is zinc and the reducible metal fuel ions are reducible zinc ions.

24. A method according to claim 11, wherein the metal fuel is zinc and the reducible metal fuel ions are reducible zinc ions.

25. A method according to claim 13, wherein the metal fuel is zinc and the reducible metal fuel ions are reducible zinc ions.

26. A method according to claim 15, wherein the metal fuel is zinc and the reducible metal fuel ions are reducible zinc ions.

27. A method according to claim 17, wherein the metal fuel is zinc and the reducible metal fuel ions are reducible zinc ions.

28. A method according to claim 1, wherein the first electrode comprises a series of permeable bodies arranged in spaced apart relation;
    wherein during charging the electrochemical cell:
        the electrochemical current is applied between the charging electrode and at least one of the permeable electrode bodies with the charging electrode functioning as the anode and the at least one permeable electrode body functioning as the cathode, such that the reducible metal fuel ions are reduced and electrodeposited as metal fuel in oxidizable form on the at least one permeable electrode body;

said electrodeposition causing growth among the permeable electrode bodies such that the electrodeposited metal fuel establishes an electrical connection between the permeable electrode bodies.

29. A method according to claim 1, wherein the second electrode is an air electrode for absorbing and reducing oxygen during discharging.

30. A method according to claim 2, wherein the second electrode is an air electrode for absorbing and reducing oxygen during discharging.

31. A method according to claim 3, wherein the second electrode is an air electrode for absorbing and reducing oxygen during discharging.

32. A method according to claim 4, wherein the second electrode is an air electrode for absorbing and reducing oxygen during discharging.

33. A method according to claim 5, wherein the second electrode is an air electrode for absorbing and reducing oxygen during discharging.

34. A method according to claim 6, wherein the second electrode is an air electrode for absorbing and reducing oxygen during discharging.

35. An electrochemical cell comprising:
a first electrode for oxidizing a metal fuel during discharging and reducing reducible ions of the metal fuel during recharging;
a second electrode spaced apart from the first electrode for at least reducing an oxidizer during discharging;
a charging electrode for oxidizing oxidizable ions of the oxidizer during recharging;
an ionically conductive medium communicating the electrodes, the ionically conductive medium comprising reducible metal fuel ions and an additive comprising poly(ethylene glycol)tetrahydrofurfuryl.

36. An electrochemical cell according to claim 35, wherein the charging electrode is selected from the group consisting of (a) the second electrode, (b) a third electrode spaced apart from the first and second electrodes, and (c) one or more bodies of the first electrode wherein the first electrode comprises a plurality of spaced apart permeable bodies for receiving the metal fuel.

37. An electrochemical cell according to claim 36, wherein the ionically conductive medium is an aqueous electrolyte solution.

38. An electrochemical cell according to claim 37, wherein the aqueous electrolyte solution is alkaline.

39. An electrochemical cell according to claim 38, wherein the aqueous electrolyte solution comprises potassium hydroxide.

40. An electrochemical cell according to claim 36, wherein the poly(ethylene glycol)tetrahydrofurfuryl is in a concentration of 0.5 mL/L to 4.0 mL/L.

41. An electrochemical cell according to claim 37, wherein the poly(ethylene glycol)tetrahydrofurfuryl is in a concentration of 0.5 mL/L to 4.0 mL/L.

42. An electrochemical cell according to claim 38, wherein the poly(ethylene glycol)tetrahydrofurfuryl is in a concentration of 0.5 mL/L to 4.0 mL/L.

43. An electrochemical cell according to claim 39, wherein the poly(ethylene glycol)tetrahydrofurfuryl is in a concentration of 0.5 mL/L to 4.0 mL/L.

44. An electrochemical cell according to claim 36, wherein the poly(ethylene glycol)tetrahydrofurfuryl has 2-5 ethylene oxide units.

45. An electrochemical cell according to claim 37, wherein the poly(ethylene glycol)tetrahydrofurfuryl has 2-5 ethylene oxide units.

46. An electrochemical cell according to claim 38, wherein the poly(ethylene glycol)tetrahydrofurfuryl has 2-5 ethylene oxide units.

47. An electrochemical cell according to claim 39, wherein the poly(ethylene glycol)tetrahydrofurfuryl has 2-5 ethylene oxide units.

48. An electrochemical cell according to claim 40, wherein the poly(ethylene glycol)tetrahydrofurfuryl has 2-5 ethylene oxide units.

49. An electrochemical cell according to claim 41, wherein the poly(ethylene glycol)tetrahydrofurfuryl has 2-5 ethylene oxide units.

50. An electrochemical cell according to claim 42, wherein the poly(ethylene glycol)tetrahydrofurfuryl has 2-5 ethylene oxide units.

51. An electrochemical cell according to claim 43, wherein the poly(ethylene glycol)tetrahydrofurfuryl has 2-5 ethylene oxide units.

52. An electrochemical cell according to claim 36, wherein the metal fuel is zinc and the reducible metal fuel ions are reducible zinc ions.

53. An electrochemical cell according to claim 38, wherein the metal fuel is zinc and the reducible metal fuel ions are reducible zinc ions.

54. An electrochemical cell according to claim 40, wherein the metal fuel is zinc and the reducible metal fuel ions are reducible zinc ions.

55. An electrochemical cell according to claim 42, wherein the metal fuel is zinc and the reducible metal fuel ions are reducible zinc ions.

56. An electrochemical cell according to claim 44, wherein the metal fuel is zinc and the reducible metal fuel ions are reducible zinc ions.

57. An electrochemical cell according to claim 46, wherein the metal fuel is zinc and the reducible metal fuel ions are reducible zinc ions.

58. An electrochemical cell according to claim 48, wherein the metal fuel is zinc and the reducible metal fuel ions are reducible zinc ions.

59. An electrochemical cell according to claim 50, wherein the metal fuel is zinc and the reducible metal fuel ions are reducible zinc ions.

60. An electrochemical cell according to claim 35, wherein the first electrode comprises a series of permeable electrode bodies arranged in spaced apart relation,
wherein the spaced apart relation of the permeable electrode bodies enables the electrical current to be applied between the charging electrode and at least one of the permeable electrode bodies with the charging electrode functioning as the anode and the at least permeable electrode body functioning as the cathode, such that the reducible fuel ions are reduced and electrodeposited as fuel in oxidizable from on the at least one permeable electrode body, whereby the electrodeposition causes growth of the fuel among the permeable electrode bodies such that the electrodeposited fuel establishes an electrical connection between the permeable electrode bodies.

61. An electrochemical cell according to claim 35, wherein the second electrode is an air electrode for absorbing and reducing oxygen during discharge.

62. An electrochemical cell according to claim 36, wherein the second electrode is an air electrode for absorbing and reducing oxygen during discharge.

63. An electrochemical cell according to claim 37, wherein the second electrode is an air electrode for absorbing and reducing oxygen during discharge.

64. An electrochemical cell according to claim 38, wherein the second electrode is an air electrode for absorbing and reducing oxygen during discharge.

65. An electrochemical cell according to claim 39, wherein the second electrode is an air electrode for absorbing and reducing oxygen during discharge.

* * * * *